United States Patent [19]

Sedluk

[11] Patent Number: 6,065,003
[45] Date of Patent: May 16, 2000

[54] SYSTEM AND METHOD FOR FINDING THE CLOSEST MATCH OF A DATA ENTRY

[75] Inventor: Martin J. Sedluk, Redmond, Wash.

[73] Assignee: Microsoft Corporation, Redmond, Wash.

[21] Appl. No.: 08/914,540

[22] Filed: Aug. 19, 1997

[51] Int. Cl.[7] .................................................. G06F 17/30
[52] U.S. Cl. ........................ 707/6; 707/1; 707/3; 707/104
[58] Field of Search .................................. 707/5, 1, 3, 4, 707/6, 104, 2, 7

[56] References Cited

U.S. PATENT DOCUMENTS

| | | | |
|---|---|---|---|
| 4,058,795 | 11/1977 | Balm | 382/230 |
| 4,290,105 | 9/1981 | Cichelli et al. | 707/5 |
| 4,453,217 | 6/1984 | Boivie | 707/5 |
| 5,241,619 | 8/1993 | Schwartz et al. | 704/200 |
| 5,333,317 | 7/1994 | Dann | 707/5 |
| 5,490,061 | 2/1996 | Tolin et al. | 704/2 |
| 5,692,173 | 11/1997 | Chew | 707/3 |
| 5,729,730 | 3/1998 | Wlaschin et al. | 707/3 |
| 5,740,429 | 4/1998 | Wang et al. | 707/104 |

OTHER PUBLICATIONS

Kevin J. Farley, "Programs up to the Test", Computer Select, Data Based Advisor v11 n4 p 83(9), Apr. 1993.

Primary Examiner—Anton W. Fetting
Assistant Examiner—Greta L. Robinson
Attorney, Agent, or Firm—Jones & Askew, LLP

[57] ABSTRACT

A system and a method for generating a find list of target-entries that can be searched based on a received search-entry. The techniques used to generate and search the find list allow meaningful results to be obtained even if the search-entry contains imperfections. Target-entries are selected from the find list based on the initial characters of the search-entry. The target-entries are then compared to the search-entry using a variety of scoring heuristics. Each scoring-heuristic assigns a value based on the results of the comparison. The value proportionately indicates the closeness of the match between the target-entry and the search entry. The value obtained from each scoring-heuristic is summed to identify the score for each target-entry. The selected target-entries are then ordered based on the scores.

16 Claims, 7 Drawing Sheets

+16 Points

+2 Points

+1 Point

+16 Points

SYSTEM AND METHOD FOR FINDING THE CLOSEST MATCH OF A DATA ENTRY

TECHNICAL FIELD

The present invention relates to computer based search and matching systems and, more particularly, relates to a system and a method for finding the closet match of a single or multiple word input in a list of single and multiple word entries. The input may contain imperfections including misspellings, letter transpositions or word transpositions.

BACKGROUND OF THE INVENTION

Several techniques exist for accessing information in computer databases, data files, or through application programs and utilities to identify a matching entry of an entered search item. These techniques have been used in a variety of contexts including spelling checkers, automatic word completion utilities, search and retrieval systems, etc. Systems that incorporate these techniques are often referred to as "find list" systems. In general, a find list system performs the steps of: (1) receiving a search-entry from a source; (2) searching a find list, based on the first one or two characters of the search-entry, to identify target-entries that were possibly intended, and (3) providing one or more (if any) of the identified target-entries to a user or process.

A problem associated with most find list systems is the burden imposed upon a user or process in the initial identification of an appropriate search-entry. This problem is magnified in systems that provide find list capabilities for complex words (i.e., world atlas searches, medical terminology searches, etc.). In a typical find list system, the first one or two characters of the search-entry are used as a key to identify possible target-entries in the find list. Thus, if the first few characters of the search-entry are incorrect, (especially the first character) then the target-entries identified may be meaningless. As an example, an attempt to locate information on Georgia, may fail to provide useful results if the source provides "Jorgia" as the search-entry. It should be apparent to the reader that such systems are virtually inoperative if the source is not able to provide an accurately spelled search-entry. Therefore, there is a need in the art for a find list system that can produce meaningful results when the search-entries are imperfect due to misspellings, and especially when the first few characters of the search-entries are misspelled.

Another problem associated with most find list systems occurs when the words of a multiple-word search-entry are transposed or swapped. For instance, if the search-entry "Chelan Lake" is provided, the intended target-entry in the find list, "Lake Chelan", will not be retrieved. Therefore, there is a need in the art for a find list system that can produce meaningful results when the words of a multiple-word search-entry are imperfect due to word transpositions.

Therefore, there may be seen a need in the art for a find list system and method that provides meaningful results for imperfect search-entries.

SUMMARY OF THE INVENTION

Generally stated, the present invention provides a method for generating a find list of target-entries that can be searched based on a received search-entry. The present invention also provides a method to order or rank target-entries in the find list based on the proximity of a match between the target-entry and a search-entry. This process is performed by using a variety of scoring heuristics to compare the target-entries with the search entry and assign a value indicative of the results of the comparison. The value indicates, proportionately, the closeness of the match between the target-entry and the search entry.

Advantageously, the present invention overcomes problems of previous find list systems. The techniques used to generate and search the find list allow meaningful results to be obtained even if the search-entry contains imperfections. Thus, search-entries that are misspelled, contain letter transposition, or have word transpositions, may still result in retrieving the desired results from the find list.

A first aspect of the present invention includes generating a find list of target-entries that can be searched to identify matches of a search-entry. This process involves receiving a domain of valid results, generating target-entries by using various generating-heuristics, and inserting the target-entries into the find list. An example of one such generating-heuristic includes, for each single-word valid result, generating a target-entry that is identical to the valid result; and for each multiple-word valid result, generating a target-entry for each permutation of the words of the valid result. Other generating-heuristics could be used to generate target-entries based on common misspellings or common word prefixes and suffixes.

A second aspect of the present invention includes searching the find list of target entries and selecting target-entries that approximately match the search-entry. This process involves receiving the search-entry and examining the initial characters of the search-entry to identify one or more search preambles. The search preambles are used to determine which target-entries to retrieve from the list and are generally limited to less than four characters. Next, all of the target-entries in the find list of target-entries that begin with one of the search preambles are selected. In addition, the search preambles can be used to identify other possible search preambles that may have been intended but for a spelling error. This aspect of the invention also includes limiting the number of selected target-entries by using context and/or class filtering. Each target entry in the find list identifies applicable contexts and/or classes. The context identifies the spatial context that a particular target entry references. For instance, in an Atlas program, the context for "Ohio" could be "United States" or the context for "Georgia" could be either "United States" or "Russia". Classes refer to features that describe the target entry. For instance, the classes could include rivers, mountain. ranges, countries, restaurants, types or restaurants, etc. If the search-entry identifies one or more contexts, then target-entries that are not applicable to those contexts are not selected. Likewise, if the search-entry identifies one or more classes, then target-entries that are not applicable to those classes are not selected.

A third aspect of the present invention includes comparing each of the selected target-entries to the search-entry, identifying a score based on the comparison, and then ordering the target-entries based on the scores. The comparisons are performed by applying various scoring-heuristics. The results of applying each of the scoring heuristics are summed for each target-entry to identify the score of the target entry.

These and other aspects, features, and advantages of the present invention will be more clearly understood and appreciated from a review of the following detailed description of the present invention and possible embodiments thereof, and by reference to the appended drawings and claims.

DETAILED DESCRIPTION

Figure 1:
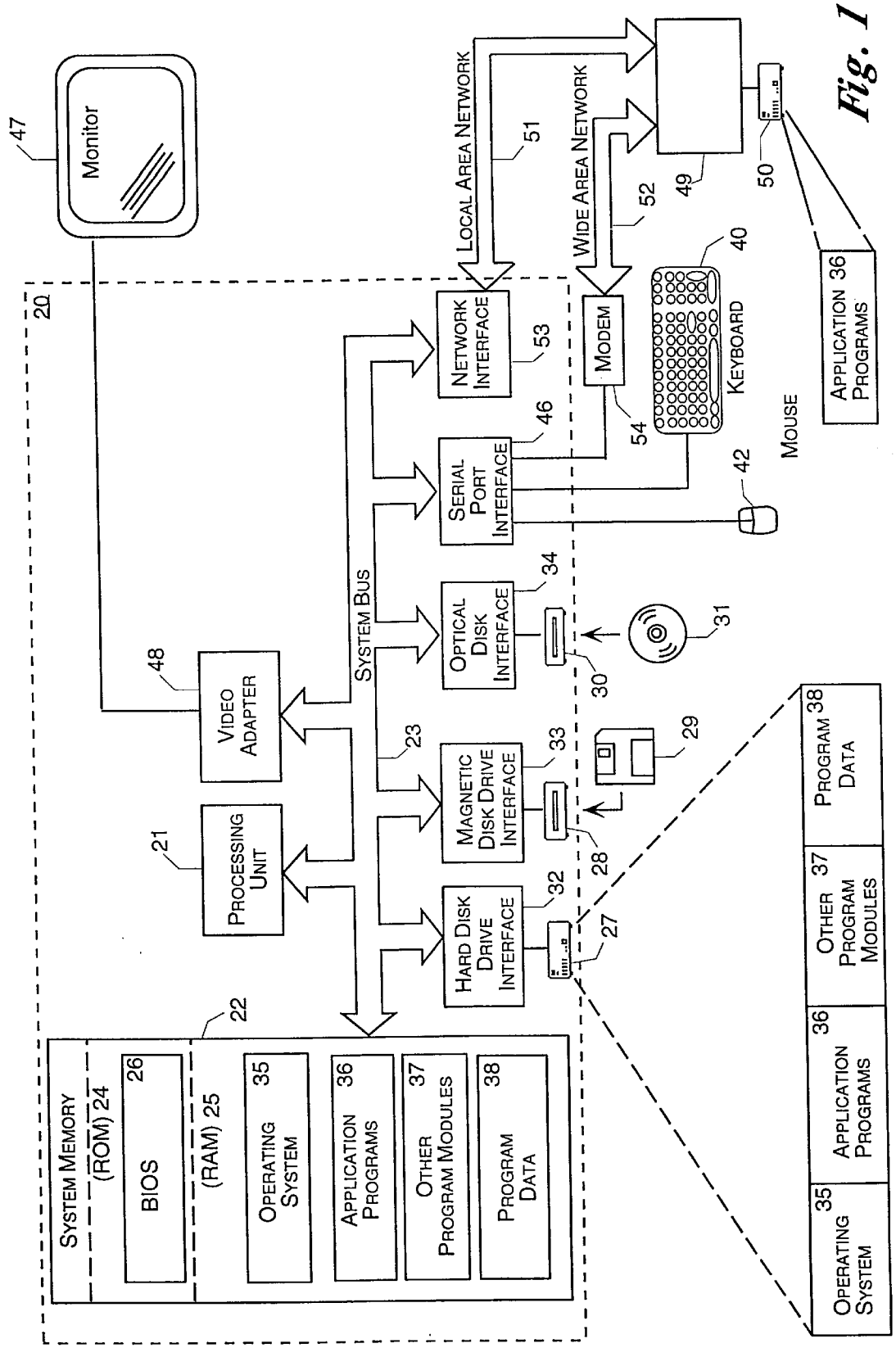
FIG. 1 is a system diagram that illustrates an exemplary environment suitable for implementing embodiments of the present invention.

The present invention is directed toward a search and match system that intelligently generates and searches a find list for matches to a search-entry and, more particularly, a method and system for intelligently finding the closet match of a single or multiple-word search-entry in an intelligently generated find list of single and multiple-word entries even when the search-entry contains spelling errors, letter transpositions, or word transpositions.

One aspect of the present invention is to intelligently generate a find list from a domain of valid results. If the find list is for a world atlas searching system, then the domain of valid results could include the names of countries, cities, counties, providences, rivers, mountains, lakes, oceans, etc. The list is intelligently generated by applying a set of generating-heuristics that produce a comprehensive find list.

Another aspect of the present invention is, to intelligently search the find list for target-entries that match a search-entry. The find list is intelligently searched by applying a set of search-heuristics. The search-heuristics operate to broaden the scope of the search so that meaningful matches can be identified in the find list even though the search-entry is imperfect.

Another aspect of the present invention is intelligently scoring and ranking the target-entries to assist a user or process in the selection of the best match. The target-entries are intelligently scored by applying a set of scoring-heuristics that compare each target-entry with the search-entry and identifies a score for the target-entry, based on the proximity of the match with search-entry.

Finally, the present invention provides a system and a method for efficiently identifying and ranking matching target-entries in a find list, based on a search-entry that may contain spelling errors, letter transpositions, and/or word transpositions. Efficiency is obtained by storing the find list on a non-volatile memory device and accessing portions of the find list through a range table stored in a fast access memory source such as dynamic RAM. The use of the range table minimizes the amount of data read from the non-volatile memory device and, thus, improves the performance time. The present invention also provides a classification filtering capability to reduce the processing time of ranking identified target-entries.

Referring now to the drawings, in which like numerals represent like elements throughout the several figures, these aspects of the present invention and the preferred operating environment will be described.

EXEMPLARY OPERATING ENVIRONMENT

FIG. 1 is a system diagram that illustrates an exemplary environment suitable for implementing embodiments of the present invention. FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules or application programs as well as a combination of interacting hardware and software components.

Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary system illustrated in FIG. 1, includes a conventional personal computer 20, including a processing unit 21, system memory 22, and a system bus 23 that couples the system memory to the processing unit 21. The system memory 22 includes read only memory (ROM) 24 and random access memory (RAM) 25. The ROM 24 provides storage for a basic input/output system 26 (BIOS), containing the basic routines that help to transfer information between elements within the personal computer 20, such as during start-up. The personal computer 20 further includes a hard disk drive 27, a magnetic disk drive 28 for the purpose of reading from or writing to a removable disk; 29, and an optical disk drive 30 for the purpose of reading a CD-ROM disk 31 or to read from or write to other optical media. The hard disk drive 27, magnetic disk drive 28, and optical disk drive 30 interface to the system bus 23 through a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Berrnoulli cartridges, and the like, may also be used in the exemplary operating environment.

A number of program modules may be stored in the drives 27–30 and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, track ball, light pen, game pad, scanner, camera, or the like. These and other input devices are often connected to the processing unit 21 through a serial port interface 46 that is coupled to the system bus, but may be connected by other interfaces, such as a game port or a universal serial bus (USB). A computer monitor 47 or other type of display device is also connected to the system bus 23 via an interface, such as a video adapter 48. In addition to the monitor, personal computers typically include other peripheral output devices (not shown), such as printers, speakers and plotters.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. These types of networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

GENERATION OF THE FIND LIST

Figure 2:
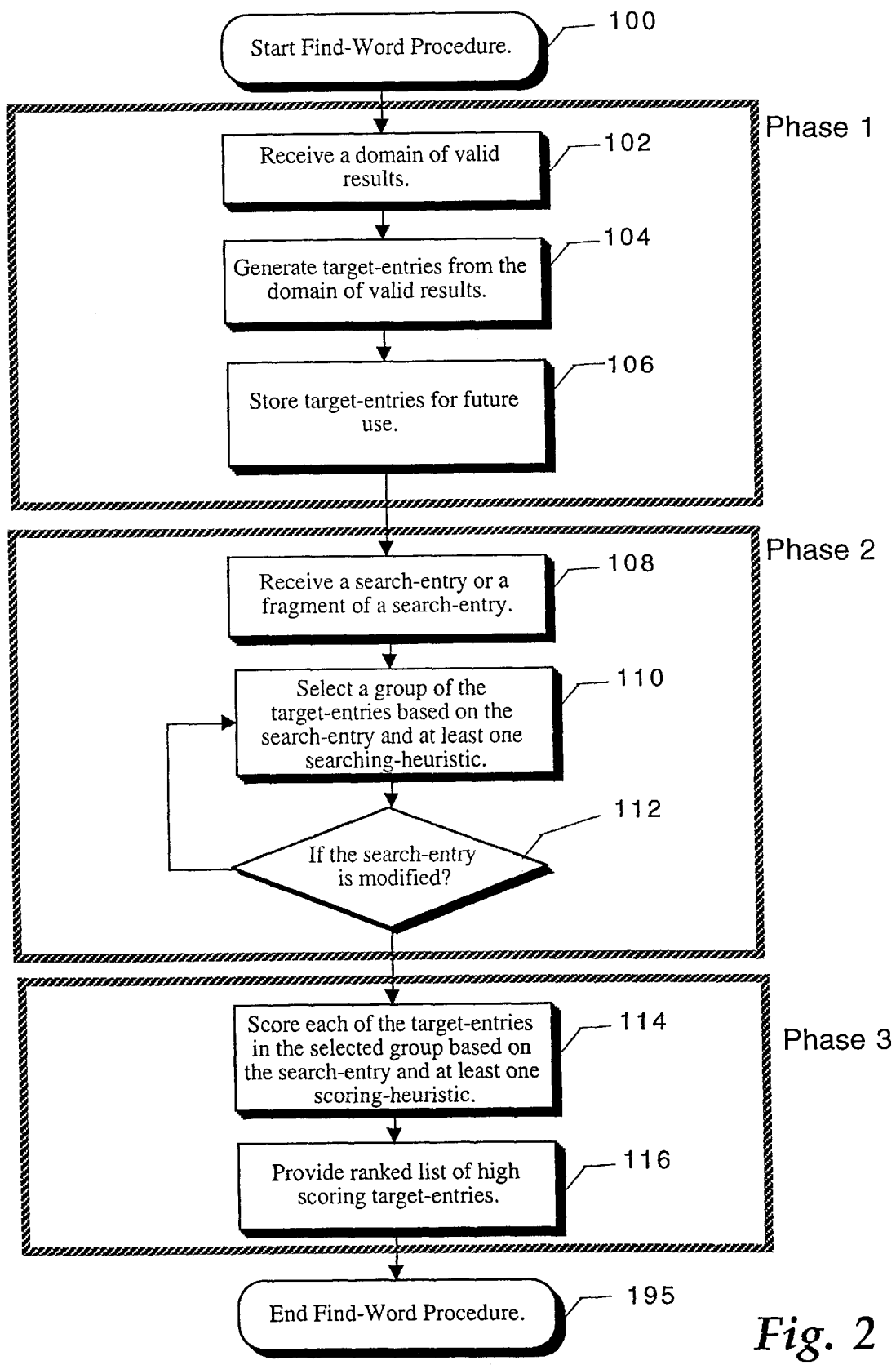
FIG. 2 is a flow diagram illustrating the process of an exemplary embodiment in intelligently generating and searching a find list for matches to a search-entry.

FIG. 2 is a flow diagram illustrating the process of an exemplary embodiment for intelligently generating and searching a find list for matches to a search-entry. The process begins at step 100 and includes three phases. The first phase involves intelligently generating a find list. The second phase involves intelligently searching the find list, and retrieving target-entries from the find list based on a received search-entry. The third phase involves intelligently scoring and ranking the retrieved target-entries.

The first phase begins at step 102 by receiving a domain of valid results. The domain of valid results includes all of the possible words or sets of words that can be searched. In a world atlas application, the domain of valid results may include the names of countries, cities, counties, providences, rivers, mountains, lakes, oceans, etc. In a medical research application, the domain of valid results could include the names of known diseases, medications, anatomy parts, medical tools, etc. The valid results may be received from user input or read from a storage media.

The domain of valid results is used as input for generating a find-list of target-entries at step 104. This process includes applying a generating-heuristics to intelligently generate target-entries for the find list. In an exemplary embodiment, the generating-heuristics include: (1) creating one target-entry that is identical to each valid result; and (2) for each multiple-word valid result, generating a target-entry for permutations of the words of the valid result. For instance, the valid result "Saint Thomas Island" would result in the generation of the following target entries:

Saint Thomas Island,
Thomas Saint Island,
Island Saint Thomas,
Saint Island Thomas,
Thomas Island Saint, and
Island Thomas Saint.

Depending upon the actual application, these steps can be performed at build time or run time. Build time is defined at the point in which the software and database files are compiled and stored onto a media. Run time is defined at the point in time that a user is operating the application. In the exemplary embodiment, only the first three entries would be generated at built time. The other entries would be generated and examined at run time.

Although an exemplary embodiment has been described as including the generating-heuristics above, this aspect of the present invention is not limited to any specific generating-heuristic or set of generating-heuristics. A key point of this aspect of the present invention is the use of generating-heuristics to intelligently generate a find list of target-entries that can be used to improve the performance of the find list system when the search-entries are imperfect. As an example, one embodiment of the present invention may include a generating-heuristic that generates target-entries containing common misspellings, such as, substituting the letter "f" for the letters "ph" and vise versa. Another embodiment may include a generating-heuristic that recognizes common or generic word prefixes and/or suffixes and generates root target-entries excluding the prefixes and/or suffixes and generates other target-entries that include the prefixes and/or suffixes.

In an exemplary embodiment of the present invention, each target-entry in the find list is used as a pointer or identifier for the desired valid result. Each of the valid results is assigned an ID number. Each target-entry generated from a specific valid result is assigned the same ID number as the valid result. Thus, the target-entries: Saint Thomas Island, Saint Island Thomas, Thomas Saint Island, Thomas Island Saint, Island Thomas Saint, and Island Saint Thomas are all associated with the same ID number as the valid result "Saint Thomas Island". Thus, the ID number facilitates a many to one mapping from target-entries to valid results and a one to many mapping from valid results to target-entries.

Once the find list is generated, the find list is stored at step 106. In the exemplary embodiment, the find list is stored on non-volatile media such as a CD ROM, and can not be altered once generated. The target-entries are sorted alphabetically and divided into several groups. The target-entries are stored on the non-volatile media in a differentially compressed form. This compression method only stores the differences between successive target-entries. For instance, if the target-entry of "Chelan" is followed by a target-entry of "Chelrntry", only enough information to identify the difference (i.e., try) between these target-entries would be stored for the subsequent target-entry. To utilize the storage space even more efficiently, additional compression can also be used. For instance, a standard form of compression known to those skilled in the art, such as PKZIP, could be used in addition to the differential compression. A range table, used to index the various groups of target-entries, is also created and stored along with the find list. In the exemplary embodiment, the range table identifies the first target-entry in each of the groups of target-entries. During operation, the range table is loaded into program memory, such as dynamic RAM, and then used to access the appropriate groups of target-entries in the find list.

Figure 3:
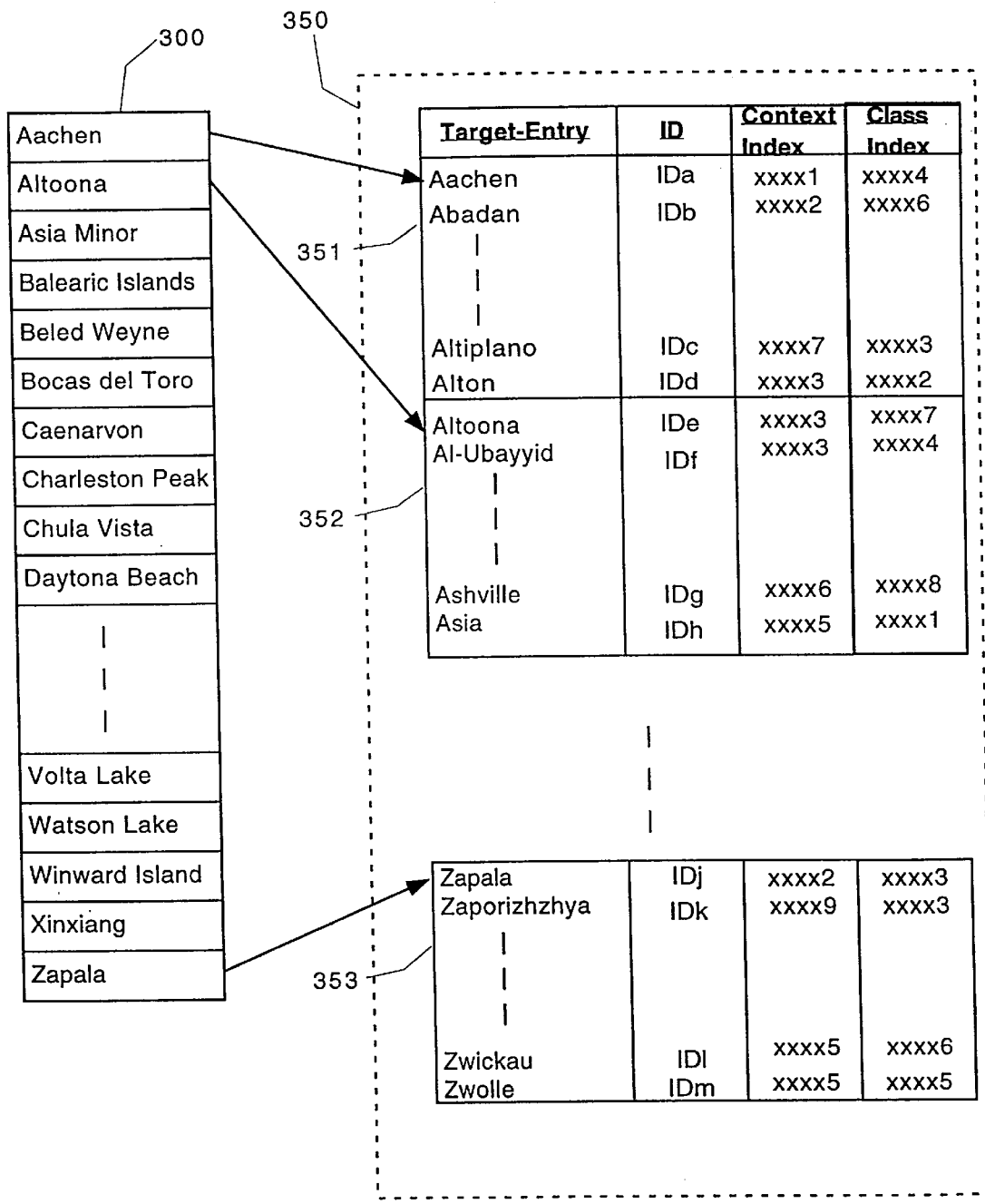
FIG. 3 is a block diagram illustrating the relationship between a range table and a find list for an exemplary embodiment.

FIG. 3 is a block diagram illustrating the relationship between a range table and a find list for an exemplary embodiment. Portions of a typical range table 300 are provided for an atlas database. Each entry in the range table (e.g., Aachen, Altoona, and Zapala) includes an indexing means used to identify a location in the find list 350. Although in the exemplary embodiment, each entry in the range table identifies the first target-entry in a block of target-entries, other methods could also be used, such as, identifying the last entry in a block, or the middle entry in a fixed sized block. Each block in the find list 350 contains a list of alphabetically sequential target-entries. The first entry in the range table 300 is "Aachen". This entry identifies the first target-entry in the first block 351 of the find list 350. The last target-entry in the first block 351 is "Alton". The present invention is not limited to any specific block size nor the requirement that the blocks be of a uniform size. The target-entry "Altoona" occurs alphabetically next after the last target-entry "Alton" in the first block 351. Thus, "Altoona" is the first target-entry in the second block 352. The second entry in the range table 300 corresponds with the first entry of the second block 352. Likewise, the last entry in the range table 300 "Zapala", identifies the first target-entry in the last block 353 of the find list 350.

Each target-entry in FIG. 3 includes an ID field used to identify the valid result associated with the target-entry. As previously described, several target-entries may have a common ID field. In addition, each target-entry includes a context field that is used to identify the contexts applicable to the target-entry. The use of context fields is described below in the discussion of searching the find list.

Although in the exemplary embodiment of the present invention, the find list is not modified once it has been generated and stored, other embodiments may provide a means for a user or process to augment the find list by adding additional target-entries. In an embodiment where the find list is stored on CD ROM, a separate file on a writable media, such as a hard disk drive, could be used. In this embodiment, the range table is modified to select target entries from the CD ROM find list as well as the modifiable find list. In another embodiment, the entire find list is stored on a writable media and can be augmented by directly integrating new target-entries into the find list.

SEARCHING THE FIND LIST

Returning to FIG. 2, the second phase begins at step 108 upon receiving a search-entry or a fragment of a search-entry from a source. The source could be a user typing the search-entry into a keyboard, an application program, or some other similar source. The search-entry may include one or more words to be searched along with a search-context and/or a search-class. These additional words are used to restrict the scope of the search. For instance, the search-entry "Rio Grande, rivers, North America" includes the search words "Rio Grande", the class "rivers", and the context "North America". In this example, the commas are used to offset the search words from the contexts and/or classes. Other methods could also be used to accomplish this and the present invention is not limited to any particular method.

At step 110, a group of target-entries are selected from the find list based on the search-entry and the search-heuristics. One search-heuristic involves breaking the search-entry into search words and context words. The search words of the search-entry are then normalized by stripping them of any punctuation and case indications. The search words are then used with another search-heuristic, to select a group of target-entries in the find list. This involves examining the initial characters of the search-entry to identify a preamble. A preamble is a set of one or more characters used in the selection of target-entries from the find list. Thus, the preamble "c" would be used to select each target entry that starts with the letter "c". Each letter of the alphabet is a valid preamble and several two or more character preambles may also be defined for various embodiment of the present invention. Once preambles of a search-entry are identified, the target-entries in the find list that begin with the one of the preambles are selected. Thus, the search-entry "chelan lake" will result in selecting all of the target entries that begin with the preamble "c".

If the initial portion of a search-entry is misspelled (i.e., "chelan lake" rather than "chelan lake"), another search-heuristic can be used to alleviate this problem. This search-heuristic involves selecting other target-entries based on a preamble exchange look-up table. This process involves selecting target-entries that do not actually start with a preamble of the first word of the search-entry, but do start with a substitute preamble identified in the preamble exchange look-up table. Table 1 below illustrates one possible configuration of a preamble exchange look-up table. The exchange rules identified in Table 1 are common misspellings that occur in the English language. Other languages would require the use of a different set of rules. The present invention is not limited to any specific set of rules or any specific preamble exchange look-up table. But rather, this aspect of the present invention focuses on the use of rules similar to these to expand the search for target-entries and alleviate problems due to misspelled search-entries.

TABLE 1

| Preamble | Substitute | Preamble | Substitute |
|---|---|---|---|
| f | ph | a | o |
| f | pf | o | a |
| ph | f | g | j |
| pf | f | j | g |
| sh | ch | r | wr |
| ch | sh | wr | r |
| c | k | w | ou |
| k | c | w | v |
| u | y | v | w |
| y | u | ur | eur |
| i | y | h | j |
| y | i | | |

As an example, a search-entry of "jorgia" would result in selecting all the target-entries in the find list that start with the letter "j" or the letter "g". Thus, this search-heuristic allows meaningful target-entries to be selected even if the search-entries are misspelled.

Once a broad array of target-entries have been selected, a search-heuristic, based on the context or class words of the search-entry, can be applied to reduce the number of target-entries,. This step involves eliminating target-entries that are not associated with the context and/or class words identified in the search-entry. Thus, each target-entry in the find list must include a context and/or class identifier for identifying the context and/or classes that are applicable to the target-entry. One method to accomplish this is to define an array of contexts and an array of classes. Each target-entry then includes an index into the context array to identify which contexts are applicable. In addition, each target-entry includes an index into the class array to identify which classes are applicable. Thus, if the search-entry "Rio Grande, rivers, North America" is provided, then target-entries that do not include (a) an index into the context array identifying the spatial context of North America and (b) an index into the class array identifying the class of rivers, are eliminated. Each of the entries in FIG. 3 includes an index into the context array and an index into the class array. It should be understood that this example is only one possible way to implement filtering based on context (spatial) and classes. Other embodiments may include multiple indexes into the context or class arrays.

In the exemplary embodiment, search-entries may be provided in response to a user typing on a keyboard. Upon the receipt of the first character, the process at step 108 is completed and processing continues at step 110. A first block of target-entries are then identified based on the single character preamble. This includes retrieving each of the target-entries in each of the blocks identified by words in the range table that start with the same character as the search-entry and storing the target-entries in program memory. As previously described, the find list of exemplary embodiment is compressed using two methods. Standard compression and differential compression. Prior to searching the find list each block must be decompressed from the standard compression scheme. While the first block of target-entries is being decompressed, subsequent blocks of target-entries, if necessary, can be retrieved and store in program memory. If the user enters another character during this process, then the search-entry may be modified, step 112. For instance, if the user initially enters the character c, then the process of retrieving and decompressing blocks of target-entries starting with the preambles "c" and "k" is initiated. If the user then enters the character "h", then a different set of target-entries must be retrieved. In this case, the target-entries beginning with the preambles "c" and "sh" are retrieved. In embodiments where the entire search-entry is entered at once, then the steps of updating the preambles and selecting different target-entries are not necessary.

When the entire search-entry has been entered, an indication may be provided requesting the source to accept the search-entry. This indication could require an active response from a user (i.e., pressing the enter key or the OK button) or a process (i.e., providing a signal indication). In the alternative, an indication to accept the search-entry could be omitted and a passive response, such as a delay, could be used to accept the search-entry or conclude the entry process. Once the entry of the search-entry is completed, the third phase is entered and processing continues at step 114.

SCORING THE TARGET-ENTRIES

The third phase begins at step 114 after receiving a search-entry from a source and may begin during or after the process of retrieving target-entries from the find list. At step 114, each of the selected target-entries are compared against the search-entry by applying various scoring-heuristics. As a result, a score for each target-entry is generated. The scoring-heuristics are used to compare various aspects of the search-entries and target-entries and in tandem, generate higher scores for target-entries that more closely approximate the search-entry and lower scores for target-entries that are more dissimilar to the search-entry. Initially, the score for each target-entry is set to zero. The score is then increased or decreased based on the results of each scoring-heuristic applied to the target-entry. Although the exemplary embodiment described herein uses a particular set of scoring-heuristics, the present invention is not limited nor dependent upon any specific scoring heuristic or sets of scoring-heuristics. An example of a set of scoring-heuristics included in the exemplary embodiment of the present invention is described below.

Each target-entry and search-entry may include one or more words. Thus, each comparison of a target-entry and search-entry falls into one of four comparison types based on the number of words: (1) single-word target-entry and single-word search-entry; (2) single-word target-entry and multiple-word search-entry; (3) multiple-word target-entry and single-word search-entry; and (4) multiple-word target-entry and multiple-word search-entry. Some of the scoring-heuristics described herein are only applicable to certain comparison types. Thus, the presented scoring-heuristics will be divided into groups based on the types of comparisons involved. Group 1 scoring-heuristics apply to all types of comparisons. Group 2 scoring-heuristics apply to comparisons of single-word search-entries and multiple-word target-entries. Group 3 scoring-heuristics apply to comparisons of multiple-word target-entries with multiple-word search-entries.

GROUP 1 SCORING-HEURISTICS

The following scoring-heuristics are applicable to all of the comparison types of target-entries and search-entries. Although each of these scoring-heuristics will be described as a comparison of a single-word target-entry with a single-word search-entry, the scoring-heuristics are also applicable when comparing single words of target-entries to single words of search-entries.

CHARACTER COMPARISON

Figure 4A:
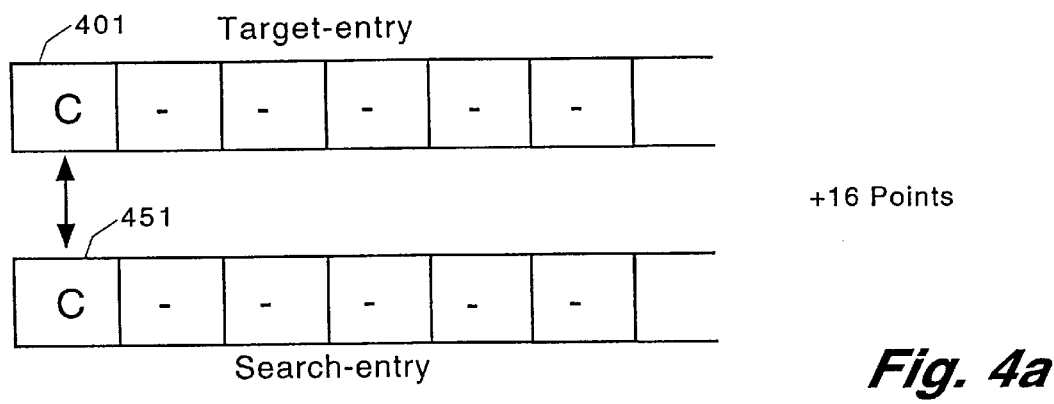
FIGS. 4a–c are conceptualized drawings illustrating examples of a character comparison scoring-heuristic.
Figure 4B:
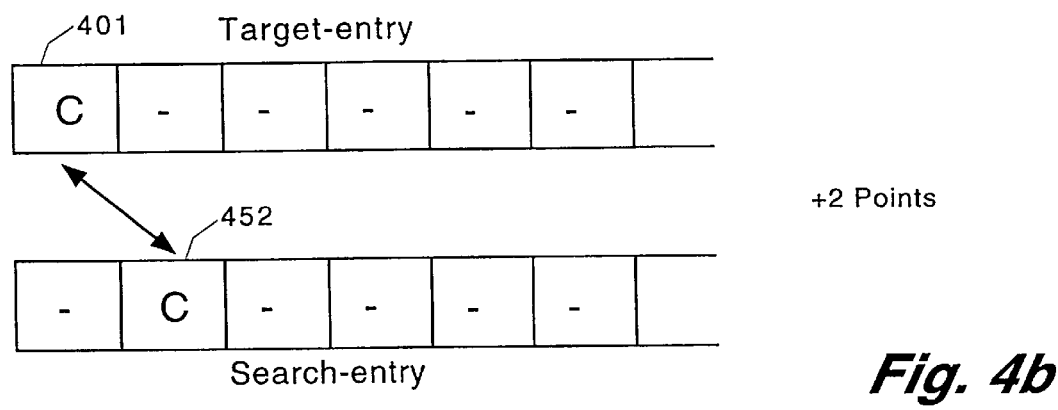
Figure 4C:
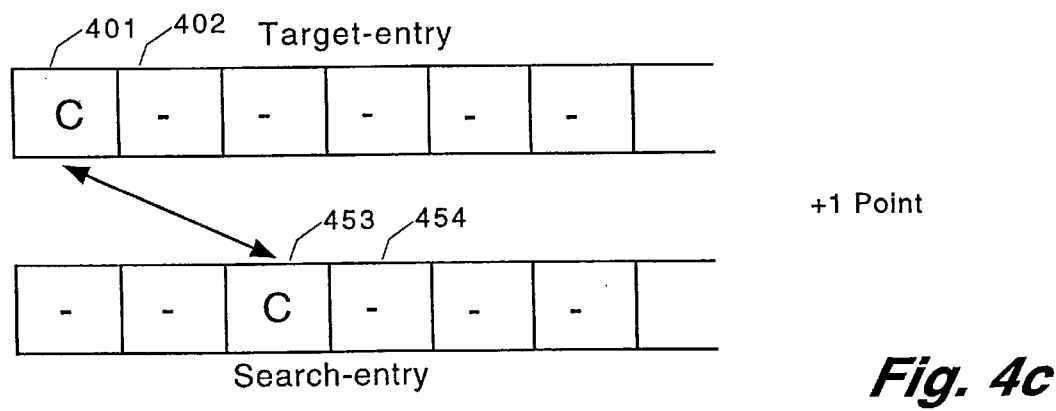

FIGS. 4a–c is a diagram illustrating examples of various aspects of a character comparison scoring-heuristic that compares each character of the target-entry with characters of the search-entry. Initially, the character in the first position of the target-entry 401 is compared to the character in the first position of the search-entry 451. If the characters match as illustrated in FIG. 4a, then the score for the target-entry 401 is increased by 16 points. If the characters do not match, the character in the first position of the target-entry 401 is compared with the character in the second position of the search-entry 452. If these characters match as illustrated in FIG. 4b, then the score for the target-entry is increased by 2 points. If these characters do not match, then the character in the first position of the target-entry 401 is compared to the character in the third position of the search-entry 453. If these characters match as illustrated in FIG. 4c, then the score for the target-entry is increased by 1 point. Finally, if these characters do not match, then the entire search-entry is searched for a character matching the first character of the target-entry. If a match is not found, then the score for the target-entry is decreased by 5 points. This process is then repeated for each character in the target-entry with the following modifications. Once a matching character in the search-entry is identified, then the character positions of the target-entry and the search-entry are re-aligned in relationship to each other. For instance, in FIG. 4c, the character in the first position of the target-entry 401 matches the character in the third position of the search-entry 453. Thus, during the next step of the process, the character in the second position of the target-entry 402 will be compared against the character in the fourth position of the search-entry 454. Another modification is that for positions beyond the first position of the search entry, the search-entry is examined forwards and backwards from the aligned position. If the characters in the aligned positions of the target-entry and search-entry do not match, then the characters in up to two positions prior to the aligned position of the search-entry may also be examined. In addition, when the position of the search-entry being examined is at the end of the search-entry, then character positions are only examined backwards from the aligned position.

CONSECUTIVE MATCHING CHARACTERS

Figure 5A:
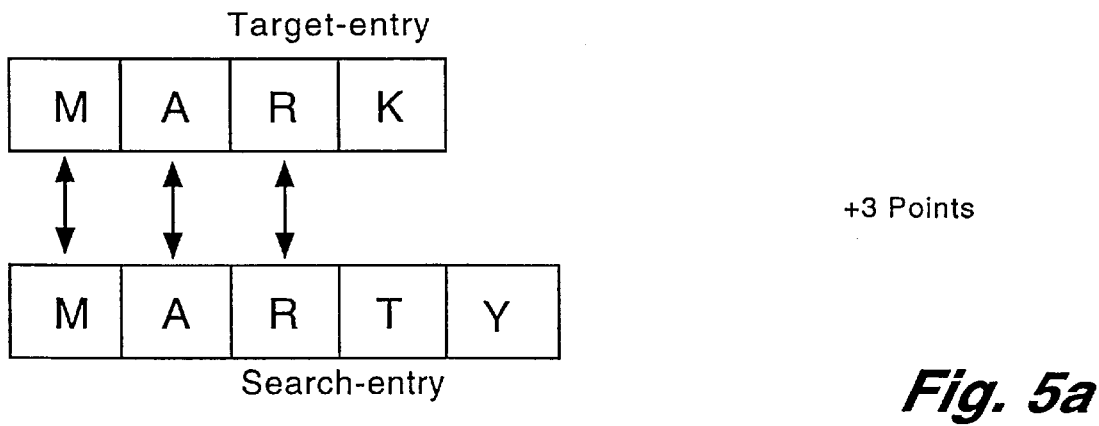
FIGS. 5a–c are conceptualized drawings illustrating examples of a consecutive matching characters scoring-heuristic.
Figure 5B:
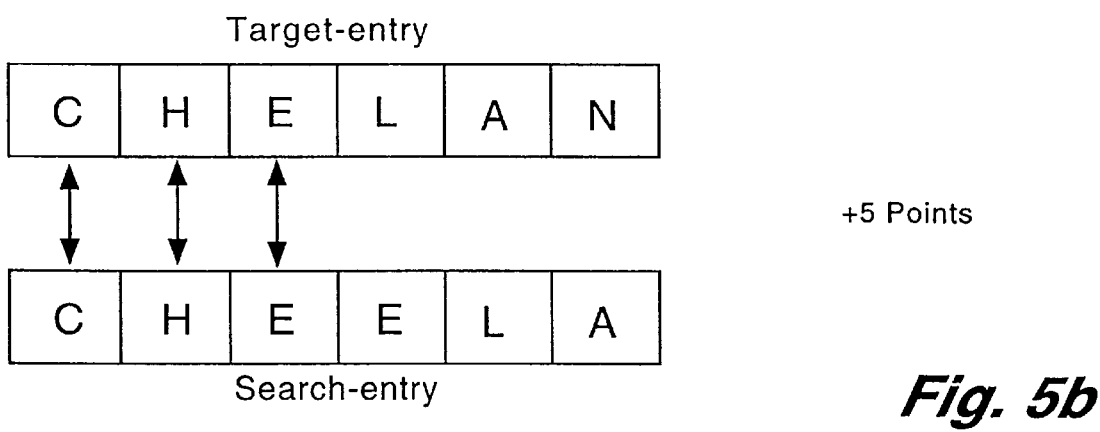
Figure 5C:
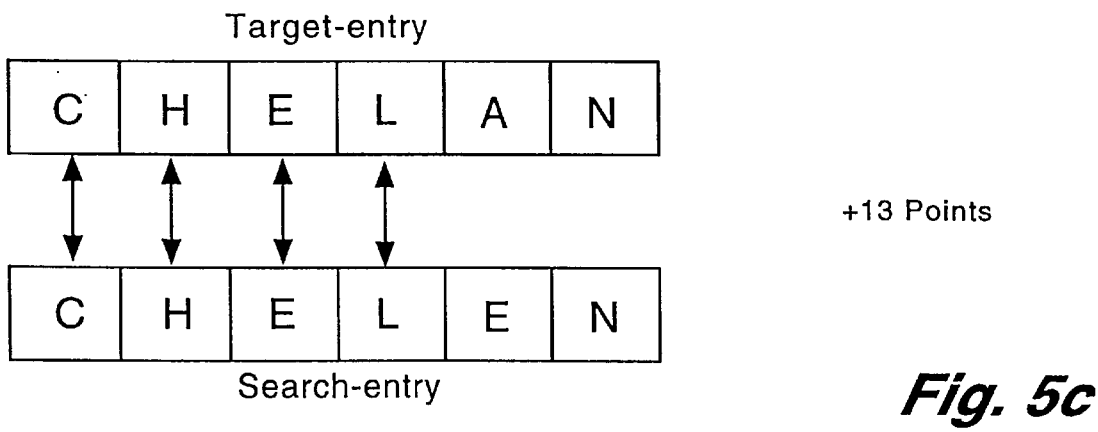

FIGS. 5a–c are diagrams illustrating the operation of a scoring-heuristic for consecutive matching characters. The number of consecutive matches that are identified by the previous heuristic are tallied. When several consecutive characters of the target-entry match several consecutive characters of the search-entry, then the score for the target-entry is modified. For instance, if three consecutive characters of the target-entry match three consecutive characters of the search entry. the score for the target-entry is increased as follows: (a) 3 points for search-entries having up to 5 character positions in total as illustrated in FIG. 5a, and (b) 5 points for search-entries having more than 5 character positions as illustrated in FIG. 5b. For search-entries having 4 consecutive characters of the target-entry that match with four consecutive characters of the search-entry, then the score of the target-entry is increased by 13 points as illustrated in FIG. 5c.

CHARACTER ALIGNMENT

Figure 6A:
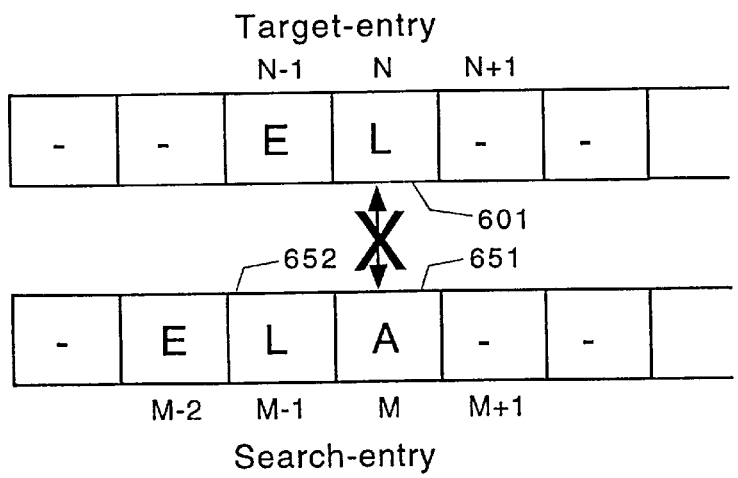
FIGS. 6a–c are conceptualized drawings illustrating examples of a character alignment scoring-heuristic.
Figure 6B:
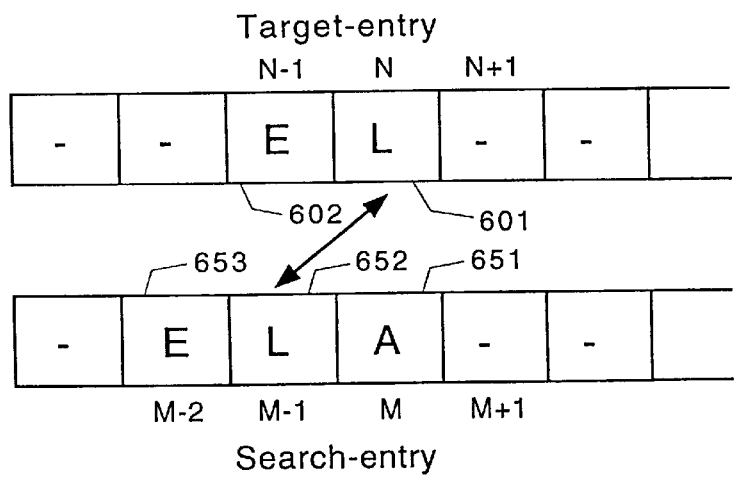
Figure 6C:
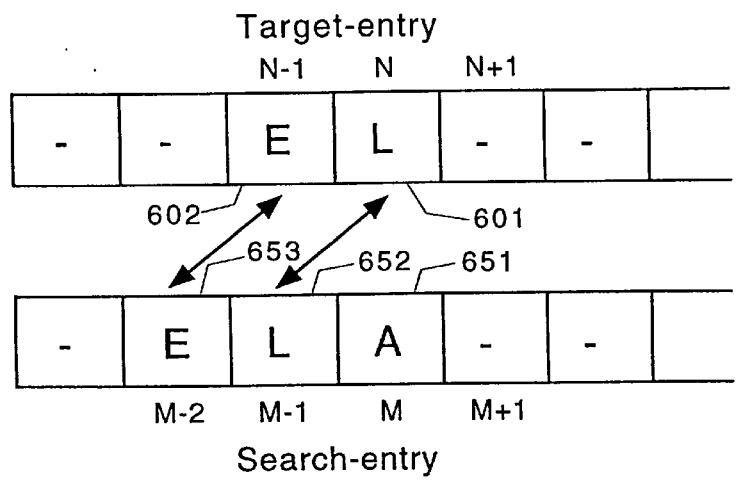

FIGS. 6a–c are diagrams illustrating the operation of a scoring-heuristic to resolve character alignment problems. This scoring-heuristic retroactively identifies alignment problems between the target-entry and the search-entry. If the character in the target-entry at position (N) 601 does not match the character at the currently aligned search-entry position (M) 651 as shown in FIG. 6a, but does match the character in the previous search-entry position (M-1) 652 as shown in FIG. 6b, then the character in the previous target-entry position (N-1) 602 is re-examined. If the character in the previous target-entry position (N-1) 602 matches the character in the appropriate search-entry position (M-2) 653 as shown in FIG. 6c, then the score of the target-entry is increased by 16 points.

SHORT SEARCH-ENTRIES

Figure 7A:
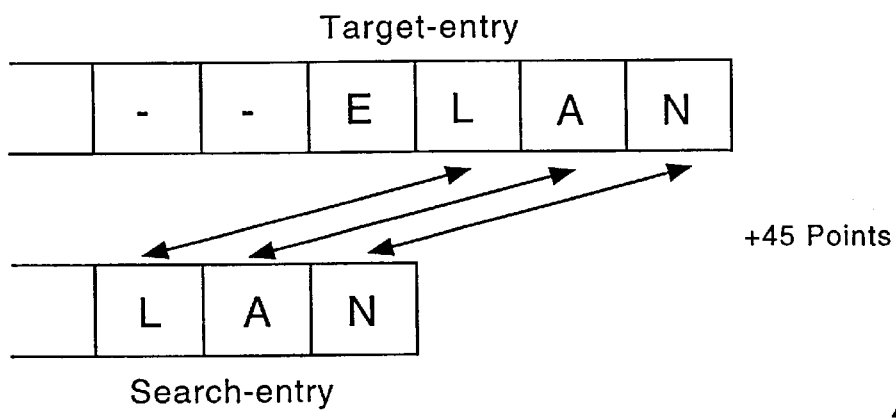
FIGS. 7a–b are conceptualized drawings illustrating examples of a scoring-heuristic used when each of the positions of the search-entry have been examined but additional positions remain in the target-entry.
Figure 7B:
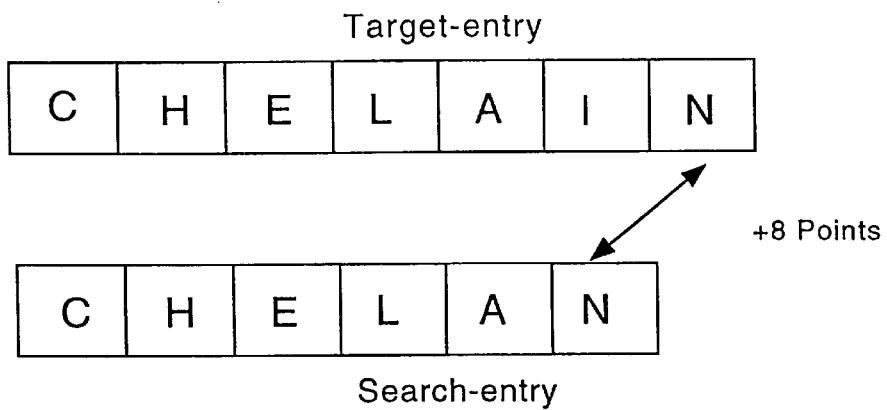

FIGS. 7a–b are diagrams illustrating the operation of a scoring-heuristic used when each of the positions of the search-entry have been examined but additional positions remain in the target-entry. Each of the characters in the remaining positions of the target-entry are compared with the characters in the last three positions of the search-entry in reverse order or until a match is found. The score for the target-entry is increased by 15 points for each matching character found. In FIG. 7a, the score is increased by 45 points due to the last three characters of the target-entry matching the last three characters of the search-entry ("LAN"). In addition, if the character in the last position of the search-entry matches the character in the last position of the target-entry, and the last position of the search-entry was reached only one character position before the last position of the target-entry, then the score for the target-entry is increased by 8 points as illustrated in FIG. 6b.

NON-MATCHING CHARACTERS

Another scoring-heuristic operates to decrease the score of a target-entry if an excessive number of characters in the target-entry do not match any characters in the search-entry. If three or more characters in the target-entry do not match any characters in the search-entry, then the score of the search-entry is decreased by 3 points.

LAST CHARACTER MATCHING

Another scoring-heuristic operates to increase the score based on the last character of the target-entry. If the character in the last position of the target-entry matches the character in the last position of the search-entry, then the score for the target-entry is increased by 16 points.

LENGTH COMPARISON

Another scoring-heuristic is used to decrease the score based on a disparity in the number of characters between the target-entry and the search-entry. If the difference in the number of character positions is greater than three, then the score for the target-entry is decreased by 16 points. If the difference in the number of character positions is three, then the score for the target-entry is decreased by 8 points. Otherwise, one point is subtracted from the score for the target-entry for each position difference.

NEARLY IDENTICAL

Another scoring-heuristic operates to flag target-entries that are identical to the normalized search-entry. This is defined as the target-entry being "nearly identical" to the search-entry. If each normalized character in the target-entry matches each character in the search-entry and is properly aligned, then the score for the target-entry is increased by 4096 points. This essentially identifies this target-entry as a likely match for the search-entry.

MINIMUM SCORE THRESHOLDS

If the score for a target-entry is less than a minimum threshold, then the score is reduced even further. In the exemplary embodiment, the minimum threshold is set at the value that would be achieved if 40% of the characters are correct. For a 10 character word, if 40% of the characters are correct, then the minimum score achievable would be 64 points (16 per character times 4 characters). Thus, if a 10 character target-entry does not attain a score of at least 64 points, then the score would be further reduced by a predetermined amount.

FAIR SCORE THRESHOLDS

If the score for a target-entry is less than a "fair" threshold, then the score is reduced by a predetermined amount that is less than the amount for the minimum score threshold requirement. The fair threshold is based on the number of characters that are in the search-entry. For one and two character search-entries, the fair threshold is set to 40% of the score attainable if all of the characters match. For three character search-entries, the fair threshold is set to 60% of the score attainable if all of the characters match. For four character search-entries, the fair threshold is set to 70% of the score attainable if all of the characters match. For any other number of characters in the search-entry, the fair threshold is set to 75% of the score attainable if all of the characters match.

IMPORTANCE INDICATORS

In one embodiment, an "importance" indicator is assigned to each of the target-entries in the find list. The scores for each target-entry are adjusted based on the assigned "importance". In the exemplary embodiment, the "importance" indicator is equated to a value from 1 to 5. The "importance" can be assigned to each target-entry based on several factors. For instance, an "importance" can be assigned to the names of cities based on population, size, number of people employed therein, gross revenue, types of industries operating therein, number of tourists that visit every year, etc. In the exemplary embodiment, the score of the target-entry is increased by 5 times the "importance" assigned to the target-entry.

GROUP 2 SCORING-HEURISTICS

If the search-entry only includes one word and the target-entry includes more than one word, then this heuristic attempts to match the search-entry word with the two target-entry words. If every character in the first target-entry word (or at least the first five characters) matches the search-entry, then the second word of the target-entry is examined. The second word is then compared to the remaining characters of the search-entry. If the results of the second word comparison are greater than zero, then the score for both target-entry words are combined.

GROUP 3 SCORING-HEURISTICS

The following scoring-heuristics are applicable to comparisons between multiple-word target-entries and multiple-word search-entries.

WORD ALIGNMENT

Using this scoring-heuristic, each word of the target-entry is compared to each word of the search-entry. The search-entry word generating the highest score for a given target-entry word is selected as a matching pair. Next, the search-entry word generating the second highest score for a given target-entry word is selected as a matching pair. This process continues, and after each word in the search-entry has been paired to a word in the target-entry, the scores for the best matches are totaled. For each target-entry word and search-entry word pair that are both in the same relative location (i.e., first, second, third word positions), the score for the target-entry is increased by 2 points. For each target-entry word that is "nearly identical" to a search-entry word, the score for the target-entry is increased by 48 points. In addition, the score for the target-entry is increased by 16 points for the first word and 16 points for each subsequent word if the character in the first position of the appropriate target-entry word matches the character in the first position of the corresponding search-entry word. However, if the first word of the target-entry and the search-entry are "nearly identical" and the other words of the search-entry do not match with any words in the target-entry, the score for the target-entry is only increased by 16 points.

WORD COUNT DIFFERENCES

If the number of words in the search-entry does not equal the number of words in a target-entry, then the score of the target-entry is reduced to 4096 points, if necessary, and then reduced further depending on the difference in the number of words. Reducing the score of the target-entry to 4096 ensures that "nearly identical" target-entries, with the same number of words as the search-entry have a higher score than "nearly identical" target-entries having a different number of words. The score for the target-entry is then further reduced in points equal to the difference in the number of words in the search-entry and the target-entry.

WORD POSITION FOR MULTIPLE-WORD ENTRIES

If the words in a multiple-word target entry are not in the same order as the associated valid result, the score of the target-entry is decreased. If the score had previously been increased by 4096 due to a "nearly identical" match, the 4096 is then subtracted from the score. Next, 16 points are added to the score for each "nearly identical" word in the target-entry, and then 16 points are subtracted from the total.

RANKING THE TARGET-ENTRIES

At step 116 of FIG. 2, each of the target-entries are ordered or ranked, based on the scores determined in step 114, to produce a ranked list. Once each of the target-entries have been ranked, they can be displayed or otherwise provided to a searching entity in an order that is most likely commensurate with the desired results (i.e., the target-entries most likely to correspond with the desired valid result are first in the order). In some cases, the number of target-entries may be excessive. Therefore, a ranking-heuristic is used to eliminate some of the target-entries based on the scores generated. This is referred to as "list chopping". Although step 116 is illustrated as occurring after step 114, in actuality, the two steps can be performed in parallel. Thus, as the target-entries are scored, the list chopping process can be performed.

The list chopping process limits the number of target-entries displayed or provided to the search entity. Initially good and bad thresholds are established. In the exemplary embodiment, as scores are examined for the various target-entries, if the score, is below the bad threshold, the target-entry is discarded. If the score is above the bad threshold, then the target-entry is maintained for the ranked list. If the score of the target-entry exceeds the good threshold, then the good and bad thresholds are increased to limit the size of the ranked list. Also, if the ranked list is limited to a particular size, then the bad threshold can be adjusted to ensure that the ranked list does not exceed this particular size.

Once a ranked list of target-entries has been generated, the ranked list can be either displayed or otherwise provided to a searching entity. The searching entity can then select the desired target-entry from the ranked list. The selected target-entry is then used to identify the corresponding valid result that is associated with that particular target-entry. The process then ends at step 195.

CONCLUSION

From the foregoing description, it will be appreciated that the present invention provides a system and a method for generating a find list of target-entries that can be searched based on a received search-entry. The techniques used to generate and search the find list allow meaningful results to be obtained even if the search-entry contains imperfections. The present invention also provides a method to order or rank target-entries in the find list based on the proximity of a match between the target-entry and a search-entry. This process is performed by using a variety of scoring heuristics to compare the target-entries with the search-entry and assign a value to the results of the comparison. This value proportionately indicates the closeness of the match between the target-entry and the search entry.

The present invention may be conveniently implemented in one or more program modules. No particular programming language has been indicated for carrying out the various tasks described above because it is considered that the operation, steps, and procedures described in the specification and illustrated in the accompanying drawings are sufficiently disclosed to permit one of ordinary skill in the art to practice the instant invention. Moreover, in view of the many different types of computers and program modules that can be used to practice the instant invention, it is not practical to provide a representative example of a computer program that would be applicable to these many different systems. Each user of a particular computer would be aware of the language and tools which are more useful for that user's needs and purposes to implement the instant invention.

The present invention has been described in relation to particular embodiments which are intended in all respects to be illustrative rather than restrictive. Those skilled in the art will understand that the principles of the present invention may be applied to, and embodied in, various program modules for execution on differing types of computers regardless of the application.

Alternative embodiments will become apparent to those skilled in the art to which the present invention pertains without departing from its spirit and scope. Accordingly, the scope of the present invention is described by the appended claims and supported by the foregoing description.

We claim:

1. A method for generating and ordering a find list of target-entries that can be searched to identify matches of a search-entry, comprising the steps of:
   receiving a domain of valid results;
   for each valid result in the domain of valid results, applying at least one generating-heuristic by,
      for each single-word valid result, generating a target-entry that is identical to the valid-result; and
      for each multiple-word valid result, generating a target-entry for each permutation of the words of the valid result;
   in response to applying a generating-heuristic, receiving at least one target-entry for each valid result;
   inserting the received target-entries into the find list;
   establishing a score for each target-entry in the find list;
   selecting at least one comparison type from a plurality of comparison types based on the number of words in each target entry;
   comparing each target-entry to the search-entry by using at least one scoring heuristic selected from a plurality of scoring-heuristics associated with the selected comparison type;
   modifying the score for each target-entry based on the comparison step; and
   ordering the target-entries in the find list according to the modified score.

2. The method of claim 1, wherein the step of applying at least one generating-heuristic, further comprising the step of;
   generating a target-entry for common misspellings for each valid result.

3. The method of claim 2, wherein the step of applying at least one generating-heuristic, further comprises the steps of:
   identifying prefixes and suffixes appended to words of the valid results;
   generating a target-entries that exclude the appended prefixes; and
   generating target-entries that exclude the appended suffixes.

4. A method for selecting target-entries from a find list of target-entries, each of the selected target-entries approximately matching a search-entry, comprising the steps of:
   examining the initial characters of the search-entry to identify at least one search preamble;
   selecting all of the target-entries in the find list of target-entries that begin with one of the search preambles;
   for each particular search preamble, retrieving any substitute preambles identified in a preamble exchange database for the particular search preamble; and
   selecting all of the target-entries in the find list of target-entries that begin with one of the substitute preambles.

5. The method of claim 4, wherein the search-entry includes a search-context that identifies particular contexts applicable to the search-entry and each particular target-entry in the find list of target-entries includes a context identifier, the context identifier identifying particular contexts associated with the particular target-entry, further comprising the steps of:
   examining the context identifier for each of the selected target-entries; and
   deselecting each target-entry that is not associated with a context identified in the search-context of the search-entry.

6. A computer-readable medium, on which is stored a computer program for performing the steps recited in claim 5.

7. A method for ordering a list of target-entries in accordance with their similarity to a search-entry, comprising the steps of:
   for each particular target-entry, equating a score for each target-entry to an initial value;
   determining the number of words in each target-entry and the search-entry;
   selecting at least one comparison type from a plurality of comparison types based on the number of words in each target-entry and the search-entry, wherein each comparison type contains a plurality of scoring-heuristics;
   comparing each target-entry to the search-entry by using at least one scoring-heuristic from the selected comparison type;
   modifying the score for each target-entry based on the comparison step; and
   ordering the target-entries in accordance with the modified score.

8. The method of claim 7, wherein the plurality of scoring-heuristics are defined and the comparing step, comprises the steps of:
   selecting at least one of the scoring-heuristics from the plurality of scoring heuristics based on the particular target-entry and the search-entry;
   for each selected scoring-heuristic,
      applying the selected scoring-heuristic to compare the target-entry with the search-entry;
      obtaining a sub-score as the result of applying the selected scoring-heuristic; and
      and the step of modifying the score for the target-entry comprises the step of adding the sum of each of the sub-scores obtained from applying each of the selected scoring-heuristic to the score for the target-entry.

9. A computer-readable medium, on which is stored a computer program for performing the steps recited in claim 8.

10. A system for generating a find list of target-entries that can be searched to identify matches of a search-entry, comprising:
   a processing unit;
   a memory storage device;
   the find list, stored in the memory storage device, containing the target-entries;
   a program module, stored in the memory storage device for providing instructions to the processing unit;
   the processing unit, responsive to the instructions of the program module, operative to:
      examine the initial characters of the search-entry to identify at least one search preamble;
      select all of the target-entries in the find list that begin with the particular identified search preamble;
      for each particular identified search preamble,
         retrieve at least one substitute preamble identified in a preamble exchange database stored in the memory storage device; and
         select all of the target-entries in the find list that begin with one of the substitute preambles; and
      for each particular selected target-entry,
         equate the score for that particular target-entry to an initial value;
         compare the particular target-entry to the search-entry by using at least one scoring-heuristic; and
         modify the score for the particular target-entry based on the comparison step; and order the selected target-entries in accordance with the score.

11. The computer system of claim 10, wherein the search-entry includes a search-context that identifies requested contexts and each particular target-entry in the find list includes a context identifier, the context identifier identifying particular contexts associated with the particular target-entry, and the processing unit is further operative to select target entries by:
   examining the context identifier for each of the selected target-entries; and
   deselecting each target-entry that is not associated with a requested context identified in the search-context of the search-entry.

12. A computer-readable medium on which is a stored a find list of target-entries and a computer program for generating an ordered list of target-entries from the find list, each of the target-entries in the ordered list at least approximately matching a search-entry, the computer program comprising instructions which, when executed perform the steps of:
   examining the initial characters of the search-entry to identify at least one search preamble;
   for each particular identified search preamble,
      select all of the target-entries in the find list that begin with the particular identified search preamble;
      retrieve any substitute preambles identified in a database for the particular identified search preamble;
      select all of the target-entries in the find list that begin with one of the substitute preambles;
   determining a score for each particular selected target-entry based on the proximity of the match between the particular selected target-entry and the search-entry;
   ordering the selected target-entries in accordance with the score.

13. The computer-readable medium of claim 12, wherein the step of determining a score for each particular selected target-entry comprises the steps of:
   equating the score for the particular target-entry to an initial value;
   comparing the particular target-entry to the search-entry by using at least one scoring-heuristic; and
   modifying the score for the particular target-entry based on the comparison step.

14. The method of claim 13, wherein a plurality of scoring-heuristics are defined and the comparing step, comprises the steps of:
   selecting scoring-heuristics from the plurality of scoring heuristics based on the particular target-entry and the search-entry;
   for each particular selected scoring-heuristic,
      applying the particular selected scoring-heuristic to compare the target-entry with the search-entry; and
      obtaining a sub-score as the result of applying the particular selected scoring-heuristic; and
   the step of modifying the score for the particular target-entry comprises the step of adding the sum of each of the sub-scores obtained from applying each of the particular selected scoring-heuristics to the score for the particular target-entry.

15. A method for providing an ordered list of target-entries that at least approximately match a search-entry, comprising the steps of:
   generating a find list of target-entries from a domain of valid results by,
      for each single-word valid result in the domain of valid results, generating a target-entry that is identical to the valid result; and
      for each multiple-word valid result in the domain of valid results, generating a target-entry for each permutation of the words of the valid result;
   selecting target-entries from the find list based on the initial characters of the search-entry and substitute characters for the initial characters of the search-entry; and
   comparing each of the target-entries with the search-entry; and
   ordering the target-entries based the results of the comparison.

16. The method of claim 15, wherein a plurality of scoring-heuristics are defined for comparing the target-entries to the search-entry, and the comparing step comprises the steps of:
   equating the score for each target-entry to an initial value;
   selecting scoring-heuristics from the plurality of scoring heuristics based on a particular target-entry and the search-entry to be compared;
   for each particular selected scoring-heuristic,
      applying the particular selected scoring-heuristic to compare the particular target-entry with the search-entry; and
      obtaining a sub-score as the result of applying the particular selected scoring-heuristic; and
      modify the score for the particular target-entry by the sub-score obtained.

* * * * *